US012514231B2

(12) United States Patent
Mott et al.

(10) Patent No.: US 12,514,231 B2
(45) Date of Patent: Jan. 6, 2026

(54) VERTICALLY-ORIENTED FOOD MAZE FOR ANIMALS

(71) Applicant: Cricket Labs, Inc., Rancho Santa Fe, CA (US)

(72) Inventors: Steven C. Mott, Rancho Santa Fe, CA (US); Jeffrey W. Hixson, Lakeside, CA (US)

( * ) Notice: Subject to any disclaimer, the term of this patent is extended or adjusted under 35 U.S.C. 154(b) by 161 days.

(21) Appl. No.: 17/316,695

(22) Filed: May 10, 2021

(65) Prior Publication Data

US 2021/0345584 A1 Nov. 11, 2021

Related U.S. Application Data

(60) Provisional application No. 63/022,268, filed on May 8, 2020.

(51) Int. Cl.
*A01K 15/02* (2006.01)
*A01K 5/01* (2006.01)
*A01K 5/02* (2006.01)

(52) U.S. Cl.
CPC .......... *A01K 15/025* (2013.01); *A01K 5/0114* (2013.01); *A01K 5/0233* (2013.01)

(58) Field of Classification Search
CPC ... A01K 15/025; A01K 5/0114; A01K 5/0233
See application file for complete search history.

(56) References Cited

U.S. PATENT DOCUMENTS

| | | | | |
|---|---|---|---|---|
| 1,687,315 A * | 10/1928 | Roche | ................... | A63F 7/3622 446/171 |
| 1,769,327 A * | 7/1930 | Wood | ................... | A63F 7/3622 446/168 |
| 2,426,915 A * | 9/1947 | Bains, Jr. | ............. | A63F 7/3622 273/120 R |
| 2,522,133 A * | 9/1950 | Sanders | ................ | A63F 7/3622 273/120 R |
| 2,686,386 A * | 8/1954 | Booth | .................... | A63B 67/08 446/168 |
| 2,729,020 A * | 1/1956 | Frampton | ................. | A63F 7/04 273/153 R |
| 2,752,727 A * | 7/1956 | Cotton | .................. | A63F 7/3622 446/168 |
| D183,649 S * | 10/1958 | Gaston | ......................... | D21/564 |
| 3,406,971 A * | 10/1968 | Koff | ....................... | A63F 7/042 273/153 R |

(Continued)

*Primary Examiner* — Ebony E Evans (57) ABSTRACT

A vertically-oriented interactive treat dispensing device for animals provides for storage of treats in a top portion, which then dispenses a treat through an input buffer into a middle portion with a set of adjoining ramps. The treat is initially retained at a resting point at a top of each ramp before it is advanced down the ramps upon physical interaction between the treat and the animal via an interaction opening adjacent the resting point. Once the treat advances down the lowest ramp, it exits the device and can be retrieved by the animal. Additional features may include electronic dispensing of treats from the top portion, incorporation of the device into a play or animal house structure, the use of an interaction lever for advancing the treats, an access arm for accessing the interior housing, and specially-designed disc-shaped treats to roll easily through the device.

17 Claims, 5 Drawing Sheets

(56) References Cited

U.S. PATENT DOCUMENTS

| | | | | |
|---|---|---|---|---|
| 3,851,879 | A | * | 12/1974 | Hicks ......................... A63F 7/02 273/120 R |
| 4,135,715 | A | * | 1/1979 | Soulos ....................... A63F 7/02 273/120 R |
| 5,056,789 | A | * | 10/1991 | Talbot ................... A63F 7/3622 273/153 R |
| 5,111,963 | A | * | 5/1992 | Grace, Sr. ............... G07F 11/52 221/75 |
| D373,511 | S | * | 9/1996 | Militzok ...................... D21/322 |
| D437,365 | S | * | 2/2001 | Flicek .......................... D21/456 |
| 7,326,059 | B2 | * | 2/2008 | Habing ................... G09B 7/02 434/236 |
| 2010/0003374 | A1 | * | 1/2010 | Hachmann ............... A23G 3/50 426/104 |
| 2019/0380303 | A1 | * | 12/2019 | Davis ..................... A01K 5/025 |

\* cited by examiner

VERTICALLY-ORIENTED FOOD MAZE FOR ANIMALS

BACKGROUND

Field of the Invention

Devices and methods provided herein relate to a toy for animals, and more specifically to a food maze for dispensing food to domestic animals.

Related Art

Humans have domesticated animals throughout history, but only in recent history have domesticated animals served as pets that are kept primarily for companionship. As pet ownership increased, owners sought to develop activities and games for their pets, either to provide entertainment, training or stimulation. This led to a boon in pet toys of all kinds, although the majority of toys were developed for dogs due to their disposition toward physical interaction with their human companions. Dog toys in particular range from balls, ropes or objects for retrieving or chewing to treat dispensers which require the dog to interact in some way in order to retrieve the treat. The majority of treat dispensers for dogs typically hide a treat within a toy and require the dog to physically interact with the toy through chewing or batting with a paw until the treat is dispensed.

In contrast, cats are generally more independent and, while still playful, more disposed to games which they play on their own or which simulate a cat's natural prey, such as a bird, mouse or other small animal. Additionally, the trend today is to not allow cats to explore the natural world and keep them inside the home. If not given enough attention and stimulation by the owner, they may become obese, lazy, anti-social, or destructive. None of these types of pet toys provide any useful training or mental stimulation for cats, which typically require a higher level of challenge and problem solving to keep their attention. For example, a cat is less likely to continue to interact with a treat dispenser if there is no apparent way to determine how to retrieve the treat and then do so, whereas a dog may be content to play with a treat dispenser indefinitely and eventually retrieve it through random or brute force. As a result, toys for cats have traditionally been less successful with the cats themselves and commercially with their owners.

A handful of pet toys have been developed primarily for cats which attempt to solve the aforementioned limitations and stimulate the cat via some type of game or challenge, often which involves the placement of a treat or food into the game to motivate the cat to interact. However, many of these toys have issues with their design, complexity and safety, and still fail to maintain a cat's attention or provide any creative stimulation. Existing toys rely on randomized interaction for dispensing or hide the treat behind a static obstacle or within the toy so that the cat cannot see, touch or taste it. Therefore, it is desirable to continue to develop improved pet toys which are more suitable for stimulating a cat.

SUMMARY

Embodiments described herein provide for a vertically-oriented interactive treat dispensing device for animals provides for storage of treats in a top portion, which then dispenses a treat through an input buffer into a middle portion with a set of adjoining ramps. The treat is initially retained at a resting point at a top of each ramp and then advances down the ramps upon physical interaction between the treat and the pet via an interaction opening on a side portion of the dispensing device. Once the treat advances down the lowest ramp, it exits the device and can be retrieved by the animal. Additional features may include electronic dispensing of treats from the top portion, incorporation of the device into a cat tower, and specially-designed disc shaped treats to roll easily through the device.

In one embodiment, a vertically-oriented food maze comprises a housing forming a hollow chamber, the housing including a treat-loading opening on a top portion of the housing for loading at least one animal treat and a treat-dispensing opening on a bottom portion of the housing for dispensing the at least one animal treat; at least one treat-interaction opening disposed on a first side portion of the housing to allow an animal to interact with the at least one animal treat; and at least one ramp disposed from the treat-interaction opening to the treat-dispensing opening, wherein the at least one ramp transports a treat from the treat-interaction opening to the treat-dispensing opening upon interaction by the animal with the at least one animal treat.

In another embodiment, a method of stimulating an animal using a vertically-oriented food maze comprises: receiving at least one animal treat into a hollow housing of a vertically-oriented food maze through a treat-loading opening on a top portion of the housing; retaining the at least one treat in a treat resting point adjacent a treat-interaction opening disposed on a side portion of the housing; and advancing the at least one treat from the treat resting point down a ramp to a treat dispensing opening by actuation of the animal with the animal treat through the treat-interaction opening; and dispensing the animal treat to the animal through the treat dispensing opening.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for a vertically-oriented interactive treat dispensing device for animals provides for storage of treats in a top portion, which then dispenses a treat through an input buffer into a middle portion with a set of adjoining ramps. The treat is initially retained at a resting point at a top of each ramp and then advances down the ramps upon physical interaction between the treat and the pet via an interaction opening on a side portion of the dispensing device. Once the treat advances down the lowest ramp, it exits the device and can be retrieved by the animal. Additional features may include electronic dispensing of treats from the top portion, incorporation of the device into a cat tower, and specially-designed disc-shaped treats to roll easily through the device.

The treat dispensing device may be made from an opaque or see-through housing and notches located on side portions of the housing for the interaction openings so that the animal is able to see, smell, touch and even taste the treat. However, the animal cannot consume it until advancing it through the entire device, which is accomplished by repeatedly pushing the treat or actuating it via a lever to advance the treat from the interaction openings and down a ramp to another interaction opening on an opposing side of the device. When the treat is advanced from the last interaction opening, it falls down a final ramp to an exit point where it exits the device and can finally be consumed by the animal.

The treat dispensing device is therefore designed as a learning product which stimulates an animal's curiosity and requires the animal to solve a maze-like problem. The device requires the animal to make a similar, repeatable action to consistently advance the treat through the device, and the see-through housing allows the animal to follow the treat through the device to learn how their actions result in the eventual release of the treat.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
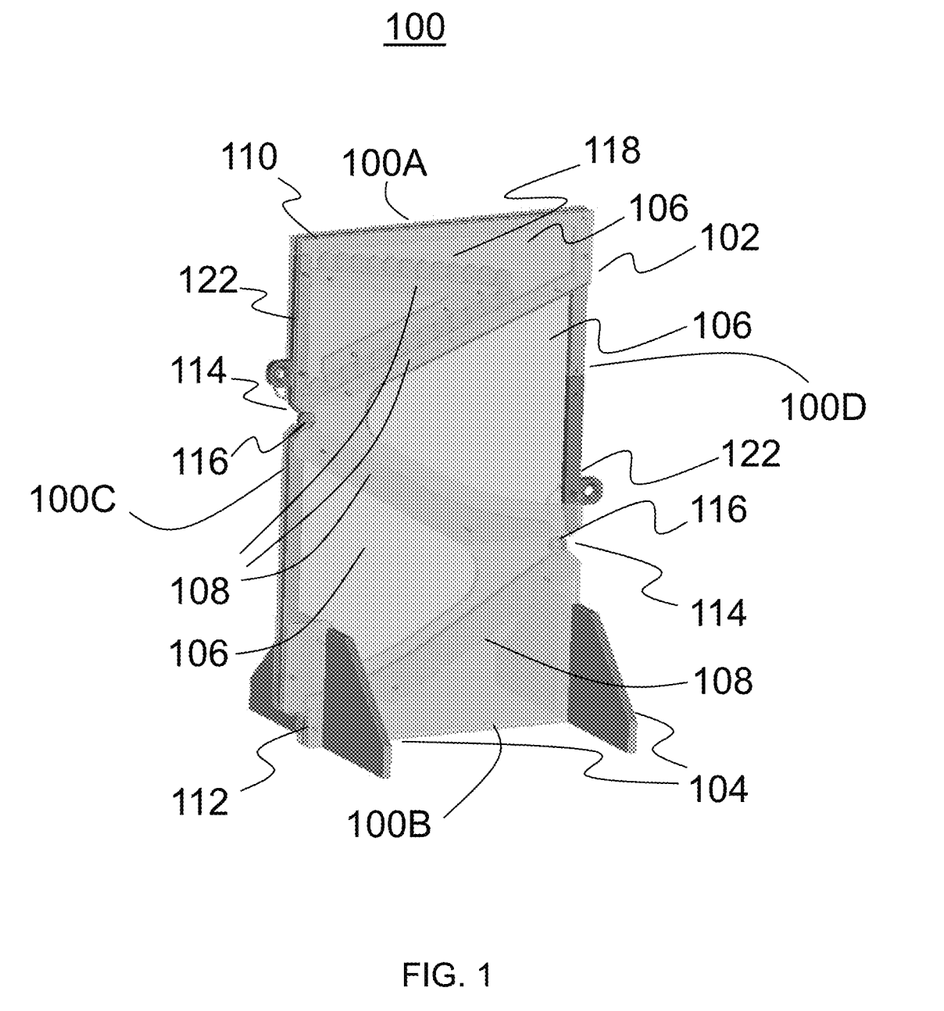
FIG. 1 is a perspective view of a vertically-oriented food maze for animals, according to one embodiment of the invention.

FIG. 1 is a perspective view of a vertically-oriented food maze for animals, according to one embodiment of the invention. The maze 100 comprises a hollow housing 102 made of a transparent or semi-transparent material, such as a polymer or polycarbonate, which allows the animal to see the treats as they move through the maze. The housing is generally rectangular-shaped and vertically-oriented in that it may have a height greater than its width, with a much smaller depth that is selected primary based on the size of the treat that is to be inserted. However, alternate shapes— whether squares or circles—of the housing may be contemplated as long as the overall function and visibility of the treat is maintained. Due to the vertical-orientation, it may be necessary to include a floor stand 104 to help maintain the maze in its vertical orientation with the expectation that an animal may attempt to tip it over.

The maze 100 therefore has a top portion 100A, a bottom portion 100B, a left side portion 100C and a right side portion 100D, with the hollow housing divided into a set of vertically-stacked chambers 106 created by a set of connecting ramps 108 which extend from the left side portion 100C to the right side portion 100D (and vice versa) in switchback fashion from the top portion 100A to the bottom portion 100B. The ramps are angled downward enough to cause a treat 116 to fall down the ramp to an adjacent ramp by the force of gravity alone, and it will be appreciated that the specific angle of the ramp may vary widely depending on the size, shape and material of the treat, and that the angle of the ramp is only limited by the degree of slope required for the treat to fall down onto the next ramp via gravity alone. In one embodiment, an access arm 122 may be integrated into the left side portion 100C and/or right side portion 100D to agitate the treats, advance them through the maze, prevent them from sticking together or allow the manual insertion or removal of treats from openings in the maze, as will be further described below. Furthermore, the treat itself may be a disc shaped food treat which could be loaded in bulk and gradually dispensed over a long period of time. In one embodiment, the treat is a chew and may be spherical in shape.

A treat loading opening 110 is disposed on the top portion 100A immediately adjacent to an uppermost portion of an uppermost ramp 108, such that one or more treats may be loaded into the maze 100 via the treat loading opening 110. Once the treat passes down through the ramps 108, it then exits the maze 100 at a treat dispensing opening 112.

The maze 100 may also include at least one treat-interaction opening 114 disposed on either the left side portion 100C or right side portion 100D, wherein the treat-interaction opening 114 may be in the form of a notch which is essentially an opening into the chamber at a point where the treat 116 falls from one ramp 108 to a subsequent ramp 108, as will be further described below with regard to FIG. 2. The notch 114 is big enough to allow an animal to place a paw or nose partially into the treat-interaction opening in order to touch, taste or smell the treat 116 at a treat resting point, while also being able to manipulate the treat 116 enough to advance the treat 116 from the treat resting point to the next connected ramp 108. The notch 114 may be sufficiently small or sufficiently shaped to prevent the treat 116 from being removed from the maze 100. The advantage of the notch 114 in the maze 100 is that it allows the animal to directly interact with the treat 116 as opposed needing to actuate a lever, button or other non-treat-related object that the animal may not logically associate with the ability to actuate the treat 116. However, an alternate embodiment illustrated in FIG. 4 and described below allows the animal to interact with an object that the animal is predisposed to enjoy, such as a tassel pull or hinged lever, to actuate the treat.

Figure 2:
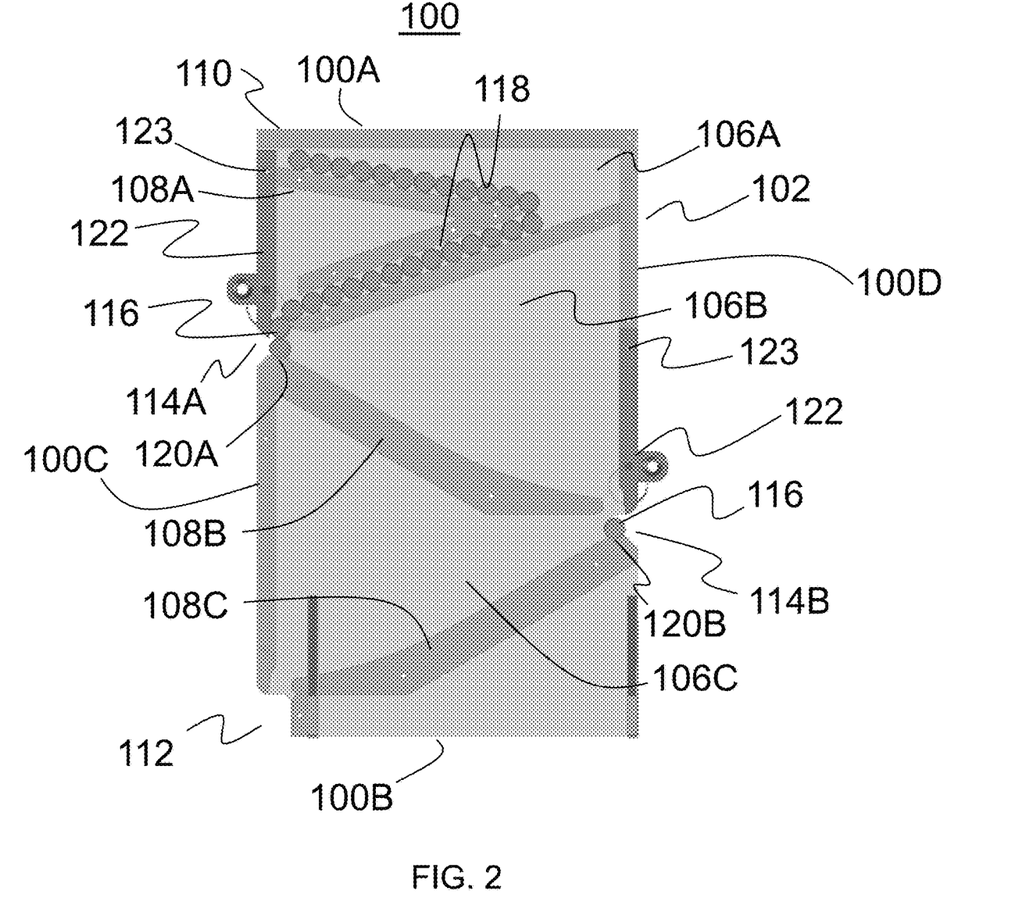
FIG. 2 is a front view of the vertically-oriented food maze for animals, according to one embodiment of the invention.

FIG. 2 is a front view illustration of the vertically-oriented food maze 100 which more clearly shows the position and shape of the chambers 106 and ramps 108 within the housing 102. In this embodiment, the chambers are individually identified by their respective positions, with a first top chamber 106A disposed at a top portion 100A of the housing 102 and utilized to receive treats 116 through the treat insertion opening 110 and store a plurality of treats therein. As shown more clearly in FIG. 2, the first top chamber 106A includes an input buffer 118 formed by the left side portion 100C of the housing and a lower-most end point of the top-most ramp 108A. The input buffer 118 allows a plurality of treats to be stored in the first top chamber 106A by limiting the number of treats which can enter into the second middle chamber 106B and onto a first treat resting point 120A adjacent to a first notch 114A. Once the treat 116 comes to rest on the first treat resting point 120A at a top of a middle ramp 108B, the animal can interact with the treat 116 through the notch 114A and sufficiently actuate the treat 116 off the treat resting point 120A so that it falls down the middle ramp 108B and across the maze to the right side portion 100D. It then falls onto a second treat resting point 120B at a top portion of a bottom ramp 108C that is part of a third bottom chamber 106C, where the treat 116 is retained on the second treat resting point 120B adjacent a second notch 114B. The animal must then interact with the treat 116 at the second notch 114B until the treat is sufficiently actuated down the bottom ramp 108C, after which the treat exits the maze 100 at the treat dispensing opening 112 on the lower portion of the maze 100.

In one embodiment, as soon as the animal dispenses one treat from the input buffer, another treat passes through the input buffer 118 and rests on the first treat resting point 120A so the animal will be continuously engaged with the maze 100 after retrieving one treat from the treat dispensing opening 112. The access arm 122 is also more clearly illustrated as it is disposed within the left side portion 100C and right side portion 100D directly above the respective treat-interaction openings 114A, 114B. In one embodiment, the access arm 122 may be a rotating mechanism which rotates outward from a pivoting attachment point 123 such that the treat-interaction openings 114 may be further opened and adjacent chambers 106 accessed to allow for treats to be inserted or removed in the event of a jam. Additionally, the access arm 122 may be shaped to bypass an opening 114 and advance the treats 116 through the maze.

Figure 3:
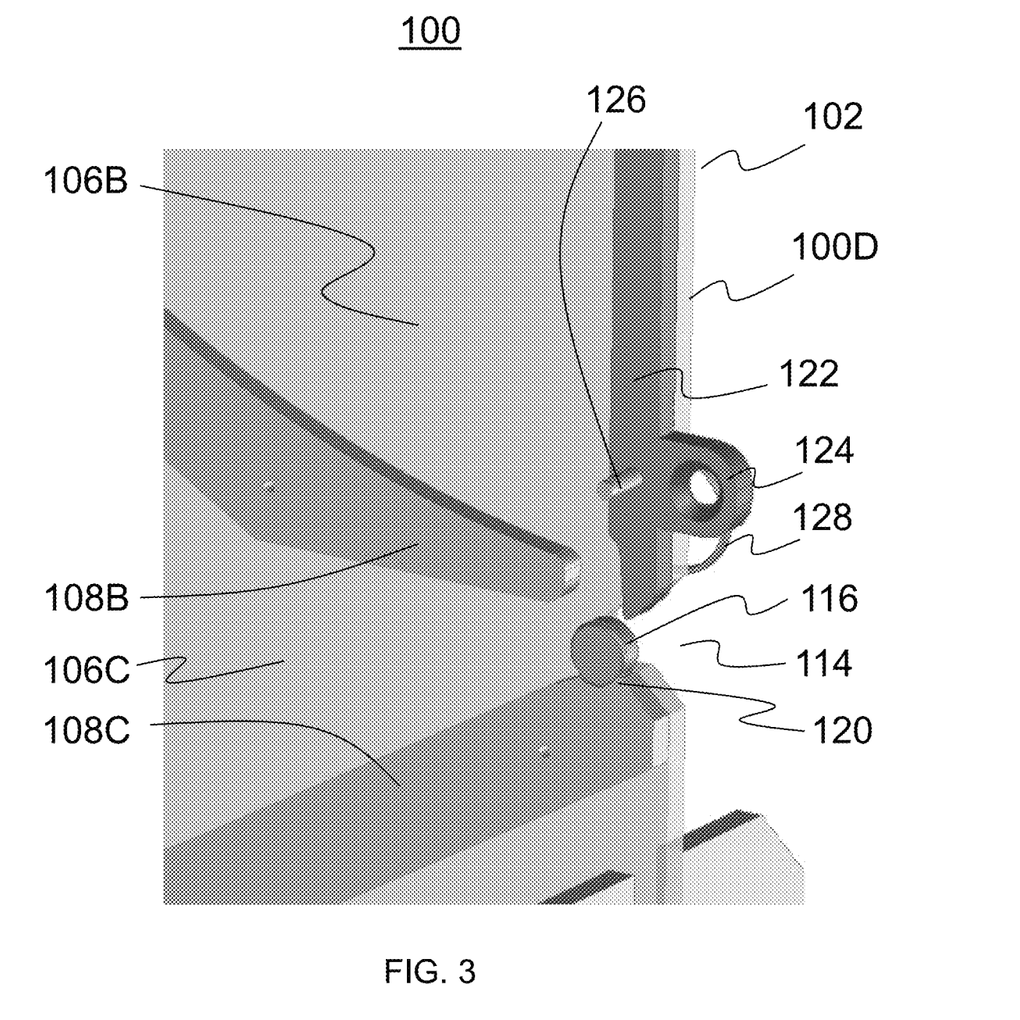
FIG. 3 is a perspective close-up view illustration of a treat resting point showing a treat-interaction opening, according to one embodiment of the invention.

FIG. 3 is a perspective-view illustration of the access arm 122 disposed within the right side portion 100D of the housing. In order to open the access arm 122, a tab 124 may extend away from the access arm 122 to allow a user to actuate the access arm 122 in an up or down motion and pivot the arm relative to the pivoting attachment point 123. In another embodiment, the access arm 122 may be locked into a closed position shown in FIG. 3 via a removable pin 126 inserted through the access arm 122 and housing 102 which can be removed by pulling on a ring 128 attached with the removable pin 126. Thus, the access arm 122 will only be movable when the pin 126 is removed. It is envisioned that the treats may be inserted through the treat-interaction openings 114 at a lower level (or simply advanced to a lower level) prior to engaging the maze with the animal in order to simplify the maze at the beginning of its use by an animal. As the animal masters the first ramp, the treat can be placed at the next ramp up, creating an additional challenge for the animal.

Figure 4:
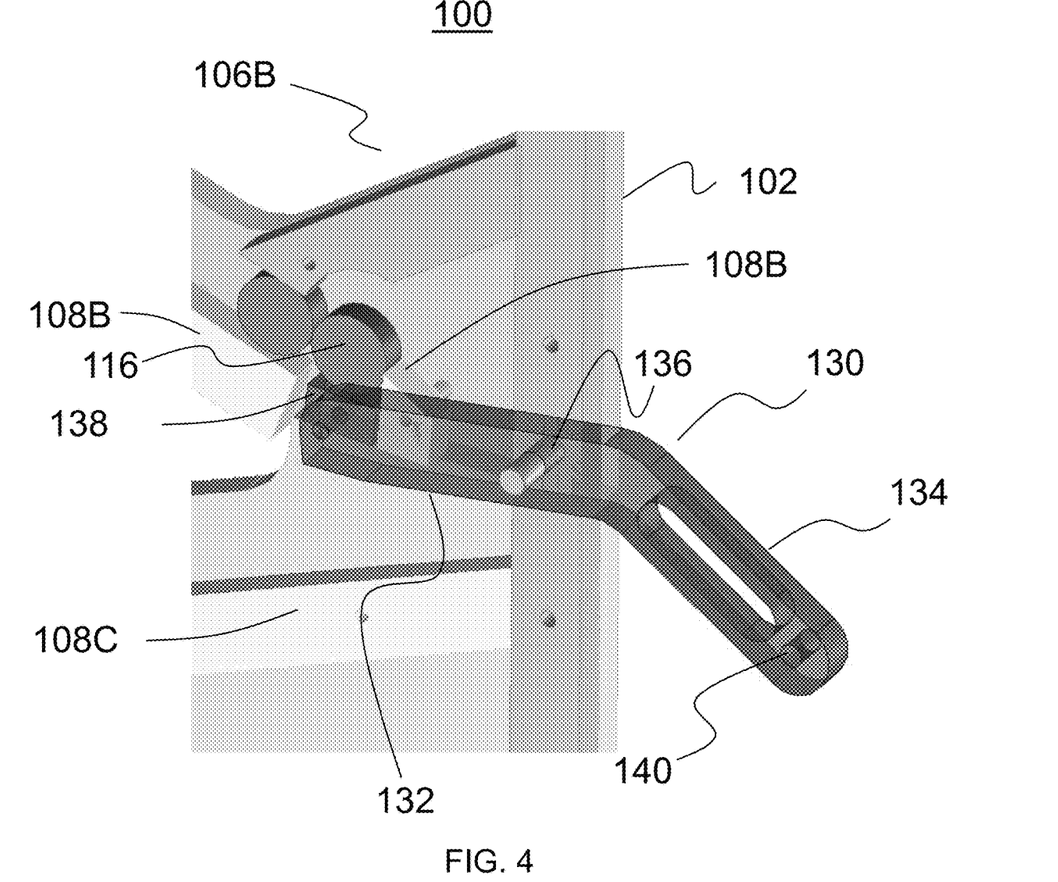
FIG. 4 is a perspective close-up view of a treat resting point showing an interaction lever to advance a treat, according to one embodiment of the invention.

FIG. 4 is an illustration of an alternate embodiment of the food maze with an interaction lever 130 disposed on a side portion for advancing the treat 116 from a one ramp to another ramp. The interaction lever 130 may replace the interaction opening 114 to provide for an animal to interact with the lever 130 instead of directly with the treat 116. As shown in FIG. 4, the lever 130 has an interior section 132 disposed within the housing 102 and an exterior section 134 disposed outside the housing 102 that acts as a handle for the animal to actuate in order to advance the treat 116. The lever is attached with the housing via a pin 136 which serves as the pivot point for the lever 130, such that the handle 134 may be actuated in a downward direction to cause the interior section 132 to actuate in an upward direction. In one embodiment, the upward movement of the interior section 132 pushes a treat retention cavity 138 upward to allow the treat 116 to advance down a remaining section of the middle ramp 108B and fall onto the bottom ramp 108C where it will continue to move through the maze 100.

In one embodiment, the lever 130 includes an attachment point 140 for attachment of objects (tassels, bells, ribbon) to attract an animal's attention and cause the animal to actuate the lever 130 to advance the treat 116.

The lever 130 may be located at multiple levels to perform the same operation for each ramp. Alternatively, the maze could be built with another set of ramps as a contingency in the event that one ramp becomes jammed. In one embodiment, the timing modes include constant delay, increasing delay, or random delay. Additionally, a sensor could be placed at the treat dispensing opening to disable further dispensing of treats until the one in the maze has been deployed. This would not only limit the number of treats for the animal to obtain, but it would further motivate the animal to retrieve the treat in the maze if there is no longer another treat readily available.

FIG. 1 also illustrates how a plurality of treats 116 may be stored in the first top chamber 106A so that numerous treats may be dispensed in sequence to keep the animal engaged with the maze 100 for a longer amount of time. Finally, one of skill in the art will appreciate that the maze may include a series of corresponding ramps of any number in order to generate a more complex maze that requires additional steps to solve before the treat is dispensed. It is envisioned that the treats may be inserted through the notches 114 at a lower level (or simply advanced to a lower level) prior to engaging the maze with the animal in order to simplify the maze at the beginning of its use by an animal. As the animal masters the first ramp, the treat can be placed at the next ramp up, creating an additional challenge for the animal.

Additional options include the idea of a bi-directional exit with stop points within the maze, such that actuation or even just movement by the animal with respect to the maze will change the outcome of the direction in which the treat moves through the maze. In order to generate interest in the maze with an animal, specific pockets or cavities may be formed for receiving another treat—such as catnip for a cat.

Although the maze is illustrated as a standalone device in the embodiments provided herein, it is also easily integrated into a larger object, such as a play structure or a cat tower, or even a wall-mount or door-mount, that allows an animal to play with the maze in a more comfortable environment. For example, if the device is built into a cat tower, the size could be scaled up as well to allow the cat to interact with the maze from the top of the cat tower all the way to the bottom. Furthermore, the standalone device may be configured with a hinged opening to allow for the housing to be opened and the device to be cleaned.

Figure 5:
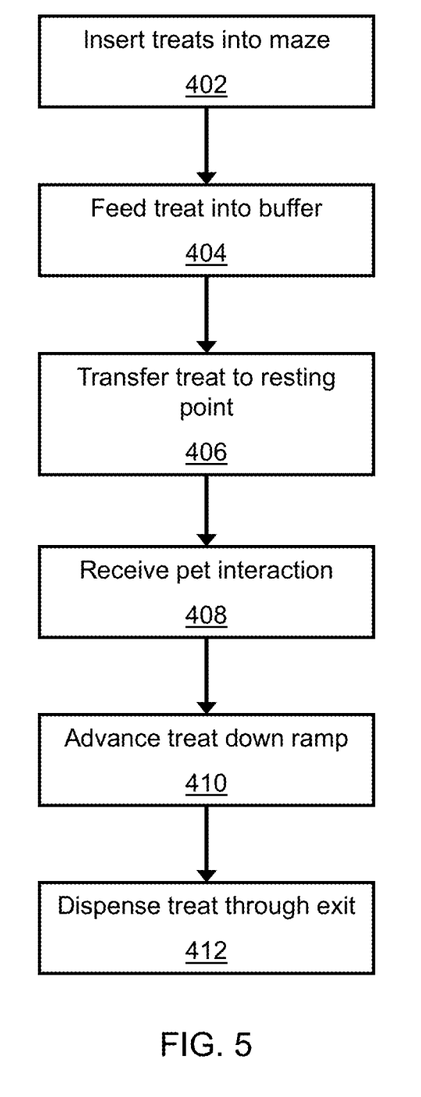
FIG. 5 is a flow diagram illustrating an example method of using the vertically-oriented food maze, according to an embodiment of the invention.

FIG. 5 is a flow diagram illustrating an example method of stimulating an animal using the vertically-oriented food maze, according to an embodiment of the invention. In a first step 402, treats are inserted into the maze and retained in the first top chamber, whereby in step 404 one or more treats are fed into a buffer to restrict the number of treats which enter the maze. In step 406, at least one treat is transferred from the input buffer to a treat resting point adjacent to a treat-interaction opening that allows the animal to interact with the treat. In step 408, the animal actuates the treat sufficiently to cause it to leave the treat resting point and fall down the adjacent ramp (step 410), where it either lands on another treat resting point on an opposing side of the maze for further interaction with the animal, or where, in step 412, it is dispensed out of the maze for consumption by the animal.

What is claimed:

1. A vertically-oriented food maze, comprising:
   a housing forming a hollow chamber, the housing including a treat-loading opening on a top portion of the housing for loading at least one animal treat and a treat-dispensing opening on a bottom portion of the housing for dispensing the at least one animal treat;
   at least one treat-interaction opening disposed on a first side portion of the housing to allow an animal to interact with the at least one animal treat, the treat-interaction opening also including a treat resting point groove at a top portion of the at least one ramp for retaining the at least one animal treat in the treat-interaction opening prior to the interaction with the animal; and at least one ramp disposed from the treat-interaction opening to the treat-dispensing opening, wherein the at least one ramp transports a treat from the treat-interaction opening to the treat-dispensing opening upon interaction by the animal with the at least one animal treat.

2. The vertically-oriented food maze of claim 1, wherein the housing is transparent.

3. The vertically-oriented food maze of claim 1, wherein the treat-interaction opening is a notch disposed in the first side portion of the housing.

4. The food maze of claim 1, further comprising a series of ramps disposed in a switchback manner across the hollow chamber between the top portion of the housing and the treat-dispensing opening, wherein each switchback from one ramp to another ramp includes a treat-resting point with a treat-interaction opening disposed therein.

5. The vertically-oriented food maze of claim 4, wherein the top portion of the housing further comprises an input buffer created by an interior side wall of the housing and a lower-most end point of a top-most ramp in the series of ramps, and wherein the input buffer limits the number of treats which can be dispensed from the top portion of the chamber into a first treat resting point.

6. The vertically-oriented food maze of claim 5, further comprising a lever positioned at the at least one treat-interaction opening to allow for mechanical advancement of the treat from the treat resting point down an adjacent ramp.

7. The vertically-oriented food maze of claim 1, further comprising an access arm disposed within a side portion adjacent the treat-interaction opening.

8. A method of stimulating an animal using a vertically-oriented food maze, comprising:

receiving at least one animal treat into a hollow housing of a vertically-oriented food maze through a treat-loading opening on a top portion of the housing;

retaining the at least one treat in a treat resting point adjacent a treat-interaction opening disposed on a side portion of the housing; and advancing the at least one treat from the treat resting point down a ramp to a treat dispensing opening by actuation of the animal with the animal treat through the treat-interaction opening; and dispensing the animal treat to the animal through the treat dispensing opening.

9. The method of claim 8, further comprising buffering an input of a plurality of animal treats from a top portion of the housing into the treat resting point.

10. The method of claim 8, further comprising electronically or mechanically restricting an input of the at least one animal treat from the top portion of the housing into the treat resting point.

11. The method of claim 8, further comprising advancing the at least one treat down a series of ramps disposed in a switchback manner across a hollow chamber between the top portion of the housing and the treat-dispensing opening, wherein each switchback from one ramp to another ramp includes a treat-resting point with a treat-interaction opening disposed therein.

12. The method of claim 8, further comprising advancing the at least one treat from the ramp to an adjacent lower ramp via a mechanically-actuated lever disposed at the treat-interaction opening.

13. A vertically-oriented food maze, comprising:

a housing forming a hollow chamber, the housing including a treat-loading opening on a top portion of the housing for loading at least one animal treat and a treat-dispensing opening on a bottom portion of the housing for dispensing the at least one animal treat;

at least one treat-interaction opening disposed on a first side portion of the housing to allow an animal to interact with the at least one animal treat, the treat-interaction opening also including a treat resting point groove at a top portion of the at least one ramp for retaining the at least one animal treat in the treat-interaction opening prior to the interaction with the animal; and a series of ramps disposed in a switchback manner across the hollow chamber between the top portion of the housing and the treat-dispensing opening, and from the treat-interaction opening to the treat-dispensing opening, wherein each switchback from one ramp to another ramp includes a treat-resting point with a treat-interaction opening disposed therein such that each ramp transports a treat from the treat-interaction opening to the treat-dispensing opening upon interaction by the animal with the at least one animal treat.

14. The vertically-oriented food maze of claim 13, wherein the top portion of the housing further comprises an input buffer created by an interior side wall of the housing and a lower-most end point of a top-most ramp in the series of ramps, and wherein the input buffer limits the number of treats which can be dispensed from the top portion of the chamber into a first treat resting point.

15. The vertically-oriented food maze of claim 14, further comprising a lever positioned at the at least one treat-interaction opening to allow for mechanical advancement of the treat from the treat resting point down an adjacent ramp.

16. The vertically-oriented food maze of claim 13, wherein the housing is transparent.

17. The vertically-oriented food maze of claim 13, wherein the treat-interaction opening is a notch disposed in the first side portion of the housing.

\* \* \* \* \*